April 3, 1951　　　　　　B. C. COIT, JR　　　　　2,547,624
COLLAPSIBLE PALLET TYPE CONTAINER
Filed Sept. 17, 1946　　　　　　　　　　　　3 Sheets-Sheet 1
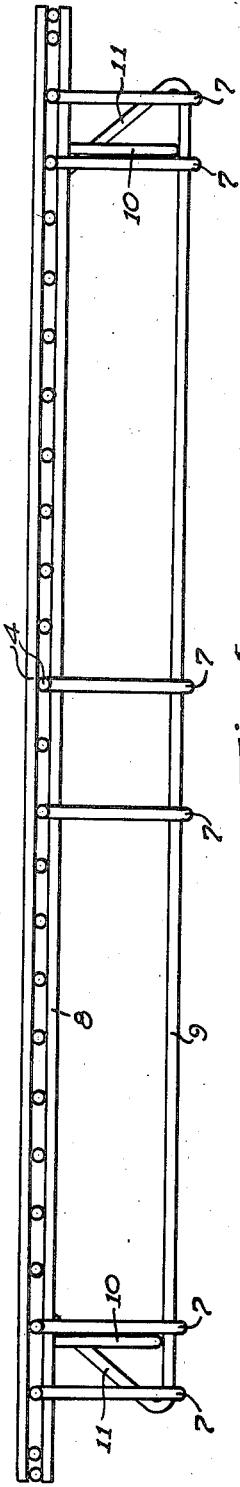
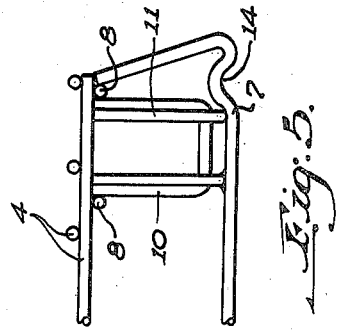
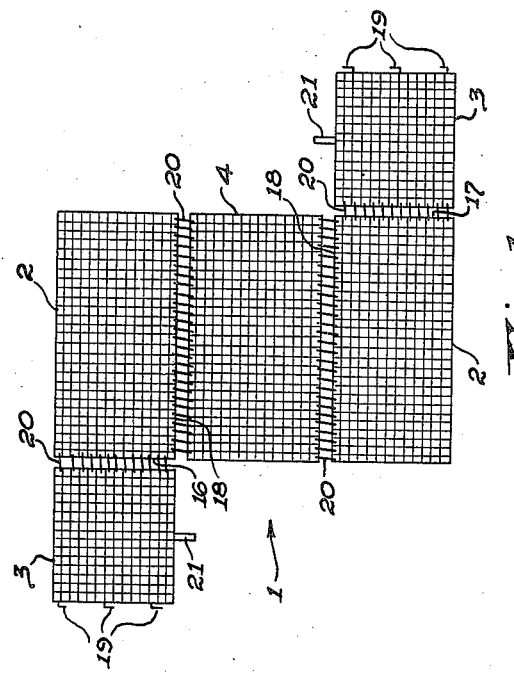
INVENTOR.
Burton C. Coit, Jr
BY
Brown, Critchlow, Flick & Peckham
his ATTORNEYS.

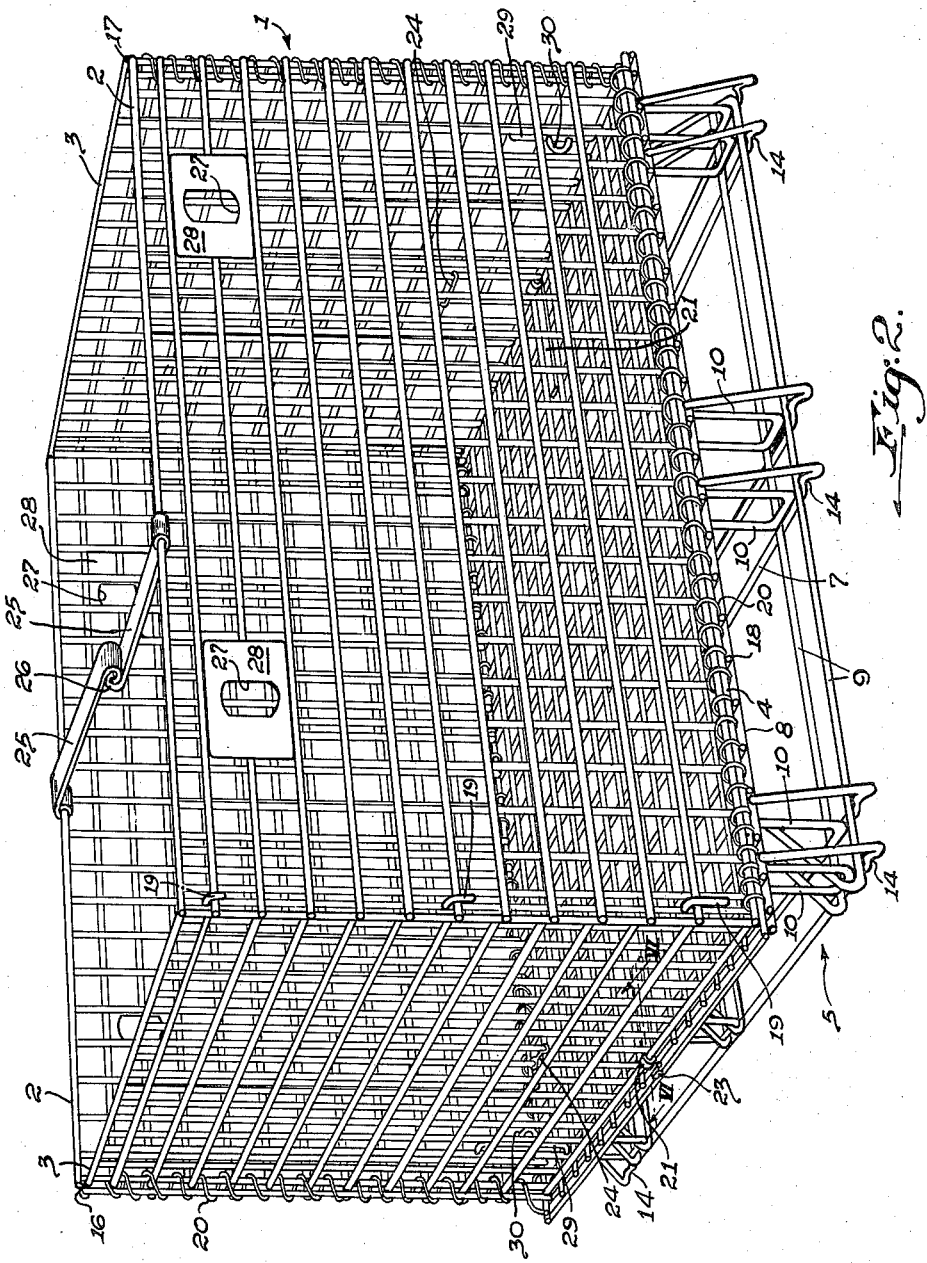

April 3, 1951 B. C. COIT, JR 2,547,624
COLLAPSIBLE PALLET TYPE CONTAINER
Filed Sept. 17, 1946 3 Sheets-Sheet 3
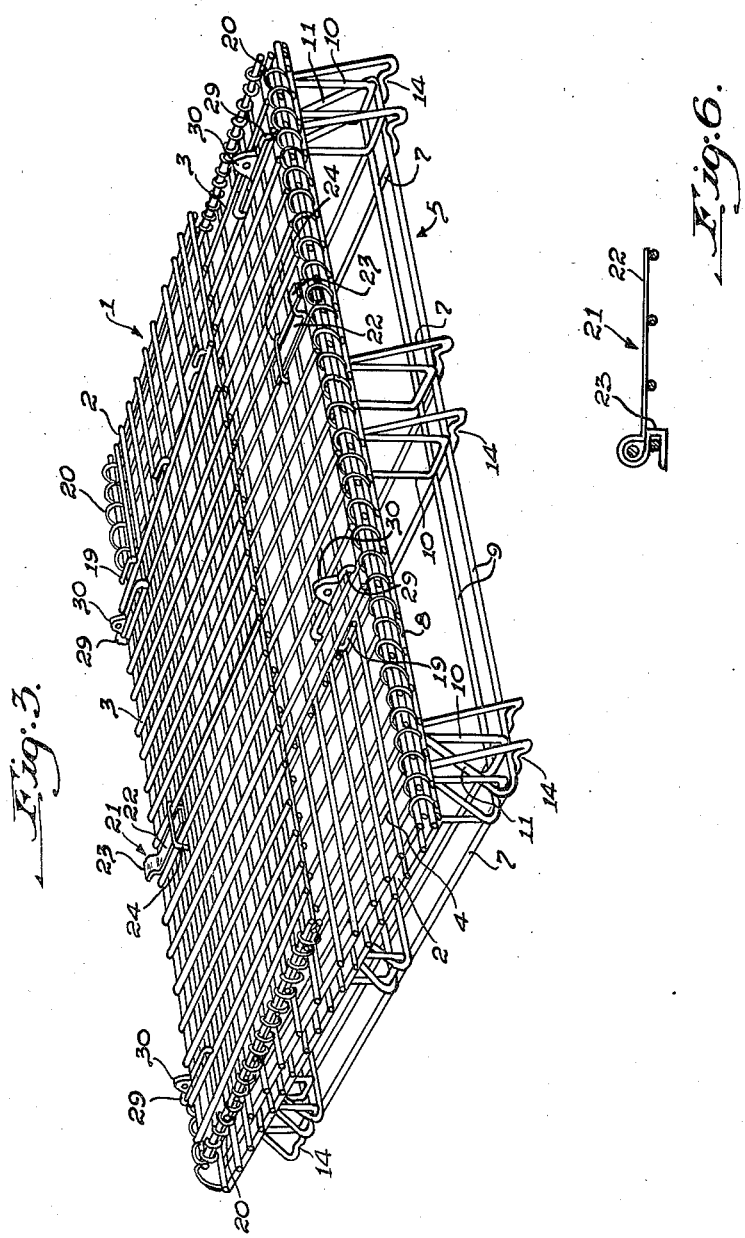
WITNESSES.
E. J. Maloney
E. O. Johns
INVENTOR.
Burton C. Coit, Jr.
BY
Brown, Critchlow, Flick & Peckham
his ATTORNEYS.

Patented Apr. 3, 1951

2,547,624

UNITED STATES PATENT OFFICE 2,547,624

COLLAPSIBLE PALLET TYPE CONTAINER

Burton C. Coit, Jr., Washington, Pa., assignor to Tri-State Engineering Company, Washington, Pa., a corporation of Maryland Application September 17, 1946, Serial No. 697,507

4 Claims. (Cl. 220—6)

This invention relates to apparatus for handling materials and, in particular, to an improved pallet for receiving and containing materials to be transported.

Pallets are used in moving materials about in factories or in transporting them to distant cities or overseas ports. Generally, they consist of a platform supported upon feet and strengthened by suitable braces. The feet and braces are spaced apart so as to leave openings therethrough for the insertion of lifting and conveying mechanism, such as a fork lift truck or the equivalent. Such a truck lifts the pallet with its unit load and carries it to a desired place, such as a waiting freight car or motor truck, where the loaded pallets are stacked upon one another, and carried to their destination. Upon arrival the unit loads are handled on the pallets until ultimately unpacked. Following this, the unloaded pallets are returned to be used again for other shipments.

The pallets presently in use are subject to a number of objections. Many are not sufficiently strong to carry heavy loads and permit stacking of one upon the other, or to withstand the rigors of rough handling and the shaking and vibration of road or sea travel. Also, considerable difficulty is experienced in securing the load on the present pallets. Normally, this is done by metal straps bound about the load and stapled or otherwise secured in place. If the straps are not attached properly or if the staples loosen, the load shakes loose. This is particularly apt to occur when the load is composed of loose, uncrated materials or if the load of crated or uncrated materials is piled too high upon the pallet. Often too, in using a crane to hoist the pallet into the hold of a ship, or the like, the pallet is swung against the dock or the hatch coaming and the load securing straps are snapped, or the unprotected material is damaged.

It is therefore among the objects of this invention to provide material handling apparatus adapted for use with a fork lift truck, or the like, which is light in weight but of sufficient strength to carry extraordinarily heavy loads, which is inexpensively and quickly fabricated, which is provided with walls to securely bind and protect the load during rough travel or handling by cranes, which readily permits safe stacking of one unit upon another, which is collapsible to occupy minimum space in its return unloaded travel, and which is provided with means permitting level stacking of the collapsed units.

According to the invention a collapsible box-like pallet is provided, the box portion of which is supported by a base that is adapted to receive conventional pallet handling mechanism, such as a fork lift truck. The structural members forming the base are so arranged as to leave openings therethrough to receive the pallet lifting forks either from the ends or sides of the pallet. The box comprises a bottom, sides and ends, each side having its lower horizontal edge pivotally connected to the bottom, and each end having one of its vertical edges pivotally connected to the edge of the side adjacent to it. To collapse the box, the ends are swung so as to lie flat against the sides and then the sides and ends collapsed upon the bottom. Preferably, diagonally opposed edges of the ends are connected to their adjacent side edges and the ends are swung outwardly through an arc of 270° so that each end lies against the outer face of a different side.

The preferred embodiment of the invention is illustrated in the accompanying drawings, of which Fig. 1 is a plan view of a collapsible box pallet with its bottom, sides and ends all lying in a plane; Figs. 2 and 3 are perspective views of the pallet box shown, respectively, in erected and collapsed positions; Figs. 4 and 5 are side and end views, respectively, showing the construction of the pallet base; and Fig. 6 is a detail view of a pallet box and lock taken along lines VI—VI of Fig. 2.

Referring to the drawings, collapsible box 1 of the pallet is constructed of sides 2 and ends 3, a bottom member or platform 4, and the box is supported by a base 5. These members preferably are made of reticulated wire, the gauge of which is dependent on the job for which the box is intended. As shown particularly in Figs. 4 and 5, the members forming the base include longitudinal base bars 7, upper horizontal braces 8 and transverse base bars 9, and U-shaped leg members 10 positioned and welded in the manner to be described. The pairs of horizontal braces 8 and base bars 9 are positioned in spaced parallel arrangement along both marginal edges of bottom 4, and also centrally thereof. The U-shaped leg members 10 extend between the horizontal braces 8 and base bars 9 and are welded at their upper ends to the pairs of braces 8, their lower ends resting on and being welded to the pairs of base bars 9. As shown in the drawings, the leg members 10 are disposed substantially at right angles to horizontal braces 8 and base bars 9 and may be divided into pairs which are positioned both marginally and centrally of bottom 4. End portions 11 of the pairs of base bars 9 are bent upwardly and rearwardly and are welded to the U-shaped members 10 in the position shown best in Fig. 4. The bars 7 extend longitudinally of the pallet and also are disposed marginally and centrally of the base 4. The pairs of transverse base bars 9 rest on and are welded to the longitudinal base bars 7, and the base as a whole is securely attached to the pallet by welding the horizontal braces 8 to reticulated bottom 4 at all points of contact with the wires of the upstanding base bars and legs.

One feature of the invention is that the base is so formed that when one pallet box is stacked upon another of similar construction, it will rest securely thereon and maintain the stacked relation. Accordingly, the ends of the bars 7 are extended beyond the marginal edges of the sides and are provided with grooves 14 (Fig. 5) which are adapted to receive the upper edges of the sides of a pallet box on which it is stacked. The ends of the base bars 7 are bent upwardly and rearwardly and are welded to the horizontal braces 8 in the manner shown. A base thus formed of nought gauge wire and about forty-four inches in length and twenty-four inches in width provides a strong support for the pallet and, in use, has supported loads of 40,000 pounds without signs of deformation. Further, the marginal and central positioning of the base members provides openings in the base for the insertion of the forks of a lift truck from the sides, ends and corners of the pallet. This latter feature is practically important since loaded pallets often are stored in crowded relation so that the lift truck can only maneuver to approach the pallets from one side, end or corner.

Another feature of the invention is the provision of a collapsible box to contain the pallet load and thereby avoid the necessity of binding the load with metal straps or the like. Also, the container permits larger loads to be carried by one pallet. The box is collapsible in order to occupy as small a space as possible on its return, unloaded trip. Referring to Figs. 1 and 2, the box has diagonally opposed vertical marginal edges 16 and 17 of its sides 2 and ends 3 pivotally connected together in such a way that each end can be swung outwardly and folded flat against the outer face of a side. Bottom edges 18 of sides 2 are pivotally connected in a like manner to the lateral marginal edges of bottom 4. With such an arrangement of parts, it is apparent that the ends 3 of the erected box can be swung outwardly through an arc of 270° so as to lie flat against the sides 2, and the sides and ends then collapsed downwardly and inwardly onto bottom 4 of the box. The sides and ends of the box are maintained in box form by providing the disconnected edges of ends 3 with a plurality of hooks 19 which are adapted to engage the wires of sides 2. Preferably the hooks are of varying length decreasing from the bottom hook to the top hook in order to facilitate the operation of applying the hooks to the wires of the sides. The manner in which the box is assembled is clearly shown in Fig. 1 in which the box is diagrammatically shown laid out flat. Referring thereto, the box is assembled by swinging ends 3 upwardly and then swinging the ends and sides upwardly to a perpendicular position. In such position, hooks 19 can be clamped about the wires of the side 2 which they engage. The lowest hooks are engaged first and then the middle and top ones engaged successively. The pivotal connections of the sides, ends and bottom are preferably made by means of coiled wires 20 wound around the adjacent edges to be connected. One advantage of the coiled wire connections is that, if it should become desirable to use the base without the box, the sides and ends of the box can be easily removed by unwinding coiled wires 20.

It is apparent that when the box is loaded with a particularly heavy load, there will be a tendency for its ends 3 to spread laterally or endwise. This is effectively prevented by the provisions of clamps 21 which are each pivotally mounted centrally on the lower edges of each end 3. Referring to Fig. 6, each clamp comprises a flat bar or lever portion 22 that is provided with a loop which engages the lower wire of an end 3, and a hook 23 for engaging outer wire at the end of bottom 4. The bar or lever normally is held against the end by means of a sliding bracket 24. When the box is erected, bracket 24 is slid upwardly to release lever 22 which is then pressed downwardly so that hook 23 engages the marginal end of the bottom. Any tendency toward lateral spreading is then prevented by this engagement. If desired, sides 2 can be held more rigidly together by the provision of a stringer or clamping rod 25, such as shown in Fig. 2. It consists of two parts the outer ends of which are pivotally attached centrally to the top edges of sides 2, and the inner ends of which are provided with fingers 26 formed to be slidably locked together.

In use, the collapsible box pallet, having been erected and loaded, the forks of a lift truck are inserted beneath the bottom and the pallet hoisted and transported, as for example, to a waiting motor truck or freight car. If the lift truck has a sufficient hoist, the pallets can be stacked directly thereby in the car. Otherwise it may become necessary to hoist the pallets by means of a crane, and for such purpose the sides of the pallet box are provided with openings 27 to receive the hooks of the crane. The openings are adequately reinforced by plates 28. The box pallets are stacked one upon the other, and as described, rest steadily thereon due to grooves 14 which are provided in the protruding portions of the base bar 7. The load then is transported to its destination at which point it is removed either by crane or by lift truck and taken to a station where the pallets are unloaded. The unloaded pallet boxes then are collapsed and stacked one upon the other for their return trip to the shipper.

It is apparent from a consideration of Fig. 3 that when the pallet boxes are collapsed the sides and ends will overlap at the center with the result that the highest portion of the collapsed box will be at the center. Thus, a piling of one collapsed pallet upon another normally would result in a rocking and unstable stack. To prevent this and to provide a level, non-rocking stack, brackets 29 (Fig. 3) are mounted on the ends 3 of the box and project inwardly of the assembled box so that when the box is collapsed the brackets project upwardly therefrom. A superimposed collapsed box pallet stacked upon another having such brackets rests upon the brackets instead of directly upon the box parts. In order to maintain this stacked relation, the brackets are provided with upwardly projecting lugs 30, which are adapted to fit between the pair of lower horizontal braces 10 of a superimposed pallet and thereby to counteract any tendency to slip sidewardly thereon.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A collapsible pallet type container comprising a pallet deck of reticulated form, having a marginal bar along each of two opposite edges, two opposite vertical crate walls each loosely connected to said marginal bars, in position to rest upon the deck when upright, and foldable upon the deck, base bars extending transversely of said marginal bars and to points beyond the adjacent edges of the deck, brace members extending backwardly and upwardly from the bars, at said points, the upper ends of the brace members being welded to the edges of the deck, other base bars extending transversely of the first-named base bars and having their ends extended backwardly and upwardly at points adjacent to the two other opposite edges of the deck and secured at their upper ends to the deck, two other oppositely disposed vertical walls, means connecting these other walls in unitary relation with the first-named walls, for folding and unfolding movements relative thereto, and leg members connecting the deck to the base bars.

2. A pallet and container structure as recited in claim 1, wherein the extended portions of the first-named base bars have upwardly offset grooves at said points, for engagement with upper edges of container walls upon which the structure is stacked.

3. A collapsible pallet type container comprising a pallet deck of reticulated form, having a marginal bar along each of two opposite edges, two opposite vertical crate walls each loosely connected to said marginal bars, in position to rest upon the deck when upright, and foldable upon the deck, base bars extending transversely of said marginal bars and to points beyond the adjacent edges of the deck, brace members extending backwardly and upwardly from the bars, at said points, the upper ends of the brace members being welded to the edges of the deck, other base bars extending transversely of the first-named base bars, some of these other bars being disposed along lines adjacent but below the first-named edges of the deck and others below approximately the mid portion of the deck, these said other bars having their ends extending backwardly and upwardly and secured to the deck, two other oppositely disposed vertical walls pivotally connected to vertical edges of the first-named walls and foldable thereon, hook members on the lower edges of these other walls and engageable with the deck at points adjacent to the back-turned ends of the last-named bars, and leg members of rod-like form connecting the deck to the base bars, at the corners of the deck and at various intermediate points.

4. A collapsible pallet type container comprising a pallet deck of reticulated form, having a marginal bar along each of two opposite edges, two opposite vertical crate walls each loosely connected to said marginal bars, in position to rest upon the deck when upright, and foldable upon the deck, base bars extending transversely of said marginal bars and to points beyond the adjacent edges of the deck, brace members extending backwardly and upwardly from the bars, at said points, the upper ends of the brace members being welded to the edges of the deck, other base bars extending transversely of the first-named base bars, and welded thereto, two other oppositely disposed vertical walls pivotally connected to vertical edges of the first-named walls and foldable thereon, hook members on the lower edges of these other walls and engageable with the deck, to prevent outward bulging of said edges, and leg members of rod-like form connecting the deck to the base bars, at the corners of the deck and at various intermediate points.

BURTON C. COIT, Jr.

REFERENCES CITED

The following references are of record in the file of this patent:

UNITED STATES PATENTS

| Number | Name | Date |
|---|---|---|
| 752,880 | Bacon | Feb. 23, 1904 |
| 923,725 | Sterrett | June 1, 1909 |
| 930,112 | Adams | Aug. 3, 1909 |
| 957,068 | La Bauve | May 3, 1910 |
| 968,028 | Brown | Aug. 23, 1910 |
| 1,626,009 | Murray | Apr. 26, 1927 |
| 1,648,025 | Molloy | Nov. 8, 1927 |
| 1,660,410 | Beckman | Feb. 28, 1928 |
| 1,890,983 | Griffith | Dec. 13, 1932 |
| 2,314,194 | Buch | Mar. 16, 1943 |
| 2,359,908 | Glantzer | Oct. 10, 1944 |